United States Patent
Fujii et al.

(10) Patent No.: US 7,427,982 B2
(45) Date of Patent: Sep. 23, 2008

(54) TOUCH PANEL AND ELECTRONIC EQUIPMENT USING THE SAME

(75) Inventors: Shigeyuki Fujii, Hirakata (JP); Kenichi Matsumoto, Hirakata (JP); Akira Nakanishi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 490 days.

(21) Appl. No.: 10/896,597

(22) Filed: Jul. 22, 2004

(65) Prior Publication Data

US 2005/0078094 A1    Apr. 14, 2005

(30) Foreign Application Priority Data

Oct. 9, 2003    (JP) .................. 2003-350499

(51) Int. Cl.
*G06F 3/041* (2006.01)
(52) U.S. Cl. ................................ 345/173
(58) Field of Classification Search .............. 345/173; 156/358
See application file for complete search history.

(56) References Cited

U.S. PATENT DOCUMENTS

| 5,626,639 A * | 5/1997 | King .................. 51/297 |
| 6,016,134 A * | 1/2000 | Ota .................. 345/104 |
| 2004/0085299 A1* | 5/2004 | Huang et al. .......... 345/173 |
| 2004/0095332 A1* | 5/2004 | Blanchard ............. 345/173 |
| 2004/0155857 A1* | 8/2004 | Duthaler et al. ........ 345/107 |

FOREIGN PATENT DOCUMENTS

| JP | 09-251159 A | 9/1997 |
| JP | 10-222305 A | 8/1998 |
| JP | 10222305 A * | 8/1998 |
| JP | 2003-202954 | 7/2003 |

* cited by examiner

*Primary Examiner*—Amr Awad
*Assistant Examiner*—Randal Willis
(74) *Attorney, Agent, or Firm*—RatnerPrestia

(57) ABSTRACT

A touch panel has an adhesive layer for mounting it on an apparatus only within a range corresponding to its visible area, excluding outer frame. By pressing, from above, only the range within the visible area where an adhesive layer is provided, it is mounted on a liquid crystal display, and thereby, formation of air bubbles and the like within the portion corresponding to the visible area can be reduced and a high quality electronic apparatus can be easily realized.

2 Claims, 3 Drawing Sheets

TOUCH PANEL AND ELECTRONIC EQUIPMENT USING THE SAME

TECHNICAL FIELD

The present invention relates to a touch panel mounted on a display screen of a liquid crystal display or the like and allowing coordinate data to be input by a push manipulation with a pen or finger in association with contents displayed and electronic equipment using such a touch panel.

BACKGROUND OF THE INVENTION

In recent years, there has been a growth in number of electronic apparatuses such as portable terminal equipment provided with a touch panel device allowing coordinate data to be input by a push operation with a pen or finger in association with contents displayed.

As the touch panels, analog resistance film type touch panels are most frequently used. Recently, in conjunction with increased demands for light-weight equipment, touch panels formed of two sheets of laminated films, the so-called film-film touch panels are coming to be widely used.

A conventional transparent touch panel will be described below with reference to the accompanying drawings.

FIG. 5 and FIG. 6 are drawings showing the conventional touch panel as mounted on a display unit.

In the drawings, sizes in the direction of thickness are shown expanded for ease of understanding the configuration.

In the conventional touch panel, first transparent conductive film 2 made of indium-tin oxide (hereinafter called "ITO") or the like is deposited by sputtering or the like on the upper side of first substrate 1 made of a light-transmitting insulating film. Further, second transparent conductive film 4 made of ITO or the like is deposited by sputtering or the like on the under side of second substrate 3 made of a light-transmitting insulating film and disposed to oppose first substrate 1.

First substrate 1 and second substrate 3 are bonded together via outer frame 50 in a picture-frame shape to oppose each other with a predetermined distance kept between first transparent conductive film 2 and second transparent conductive film 4.

Incidentally, outer frame 50 is composed of insulating layers 5A and 5B and adhesive layer 5C as shown in FIG. 5.

Further, within the region of outer frame 50, there are arranged wiring patterns, electrodes, and the like, of which illustration or explanation in detail is omitted.

In the region within outer frame 50, there is formed a region having inner circumferential edge 50L in a rectangular shape as indicated by the dotted line in FIG. 6 and the region within edge 50L allows the touch panel to be used, i.e., it provides a visible area.

At the portion corresponding to the visible area on first transparent conductive film 2, there are disposed small-sized dot spacers 6 (refer to FIG. 5) made of insulating epoxy resin or the like at predetermined intervals. First transparent conductive film 2 and second transparent conductive film 4 are in electrical connection with flexible printed circuit board 7 (hereinafter called FPC) and, thereby, both the films are connected to an external apparatus. On the entire bottom face of first substrate 1 placed at the lower side, adhesive layer 11 for mounting the touch panel on an apparatus is formed. Such a conventional touch panel is mounted by adhesive layer 11 on to liquid crystal display 12 as the mount portion in the apparatus using the touch panel.

Operation of the conventional touch panel will be described below.

When a predetermined menu is displayed on liquid crystal display 12, the user acknowledges the displayed screen via a touch panel. When a desired item is determined, the user makes a push operation on the corresponding position with a pen or finger from above second substrate 3. The push operation allows second substrate 3 to be locally bent down to thereby cause second transparent conductive film 4 corresponding to the pushed position to contact first transparent conductive film 2.

At this time, other portion than the pushed position is kept out of contact by virtue of dot spacers 6 for controlling contact between first transparent conductive film 2 and second transparent conductive film 4.

If predetermined voltages are alternately applied to first transparent conductive film 2 and second transparent conductive film 4, while the films are kept in contact with each other at the particular position by the push operation, a voltage ratio at the contacted position is signaled via FPC 7. Then, based on the signaled data, the pushed position is detected by an external circuit and an operation for the desired item is then performed.

There are disclosures of such conventional touch panels in for example Japanese Patent Non-examined Publication No. H10-222305 and Japanese Patent Non-examined Publication No. H09-251159.

Generally, when a touch panel is mounted on liquid crystal display 12, it is desired that there be no air layer interposed therebetween in order that the displayed picture is prevented from deteriorating due to difference in refractive index of light. The conventional touch panel described in FIG. 5 is configured such that adhesive layer 11 for mounting the same on the external apparatus is provided over the entire bottom face of first substrate 1 and thereby it is stuck on to liquid crystal display 12. However, in a touch panel having outer frame 50, the visible area has a hollowed portion with a thickness corresponding to the thickness in the vertical direction of outer frame 50 in a picture-frame shape. This means that the touch panel substantially has stepped portions at the boundary portions between the visible area and the outer frame. Accordingly, when the surface of the touch panel is pressed down with use of a jig made of rubber or the like to cause adhesive layer 11 to adhere to liquid crystal display 12, air bubbles are liable to be formed in around the boundary portions on account of the existence of the described stepped portions. In the worst case, the air bubbles may be formed or seen in the visible area. Thus, there has been a problem that it is difficult to mount the touch panel in a fully tightly attached state substantially not producing unevenly attached portion.

SUMMARY OF THE INVENTION

A touch panel of the present invention comprises a first substrate having a transparent conductive film, a second substrate having a transparent conductive film, an outer frame for use in bonding the first substrate to the second substrate such that a predetermined space is kept therebetween, and an adhesive layer provided on the first substrate, in which the adhesive layer is provided only at the portion corresponding to inside the inner circumferential edge of the outer frame. By virtue of this configuration, there are substantially produced no stepped portions on the side of the outer frame toward its inner circumferential edge, where the adhesive layer has its circumferential edge. Therefore, it is achieved to mount the touch panel only by pressing down the adhesive layer, excluding the outer frame, so as to bestuck to a liquid crystal display or the like of an apparatus using the touch panel. Thus, air bubbles are prevented from being formed and the touch panel can be mounted on the apparatus assuring good mountabilty and high visibility.

DESCRIPTION OF THE INVENTION

Figure 1:
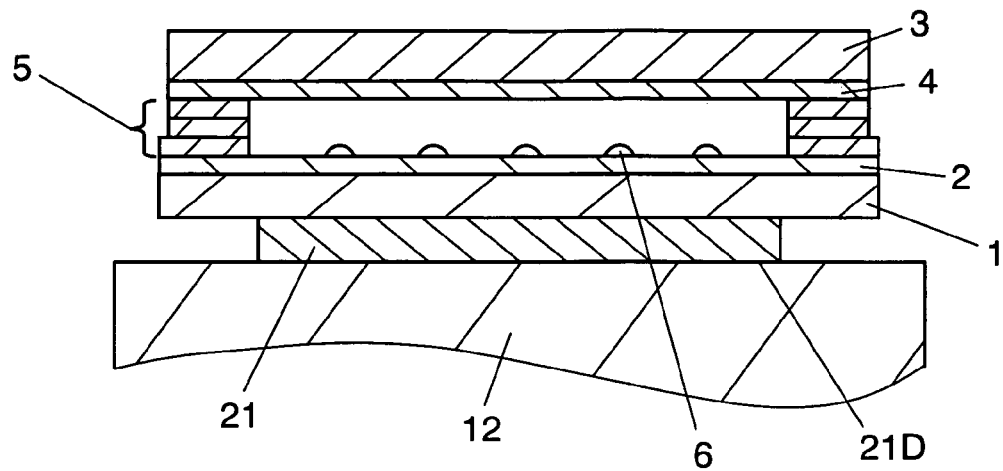
FIG. 1 is a sectional view showing a mounted state of a touch panel according to an embodiment of the present invention.

The touch panel of the present invention is such that has its adhesive layer for mounting it on an apparatus using the adhesive layer provided only within the range of the visible area. When the adhesive layer is bonded to a display of the apparatus, the touch panel can be mounted on the display by having only the adhesive layer within the visible area pressed from above. There are not formed any large steps at the portion corresponding to the visible area on which the adhesive layer is provided. Therefore, as the touch panel can be mounted on the display by having only the visible area pressed down without pressing the outer frame, the touch panel mounted on the display via the adhesive layer can assure good mountabilty and high visibility because possibility of formation of air bubbles and the like between the adhesive layer and the liquid crystal display becomes very low. As the mount portion of the apparatus, a display such as a liquid crystal display, EL display or the like will be selected.

The touch panel of the present invention further has a separator stuck to the side of the adhesive layer, which is the opposite side to the adhesive layer where the insulating film is bonded. The size of the separator is set to be larger than the range in which the adhesive layer is provided and to be equal to or smaller than the outer shape of the insulating film. The separator is arranged to have its end sticking out to the portion corresponding to the outer frame in a picture frame shape, where there is provided no adhesive layer, so that the separator can be peeled off by picking up the end portion. Therefore, the portion corresponding to the outer frame where there is formed no adhesive layer can be effectively used and handling is facilitated and mountability is improved of the touch panel.

The electronic apparatus of the present invention has a touch panel of the present invention affixed by means of an adhesive layer provided only in the range corresponding to the visible area of the display. Since the portion within the visible area is mounted in a tightly attached state, formation of air bubbles and the like in the visible area of the display is reduced and, hence, a high-quality electronic apparatus providing increased visibility can be realized.

The touch panel of the present invention will be concretely described in an embodiment.

Embodiment

An embodiment of the present invention will be described with reference to FIG. 1 to FIG. 3.

Incidentally, components of the same configuration as the configuration described in the conventional art example will be denoted by like reference numerals.

As shown in FIG. 1, the touch panel according to the present embodiment has first substrate (first film) 1 made of a light transmitting insulating film and, on the upper face of first substrate 1, there is formed, by sputtering, first transparent conductive film 2 made of indium-tin oxide (hereinafter called "ITO") or the like. On the under side of second substrate 3 (second film) made of a light transmitting insulating film, disposed to oppose first substrate 1, there is formed, by sputtering, second transparent conductive film 4 made ITO or the like. These first substrate 1 and second substrate 3 are arranged to oppose each other by being bonded together via outer frame 5 in a picture frame shape so as to keep a predetermined distance therebetween.

Figure 3:
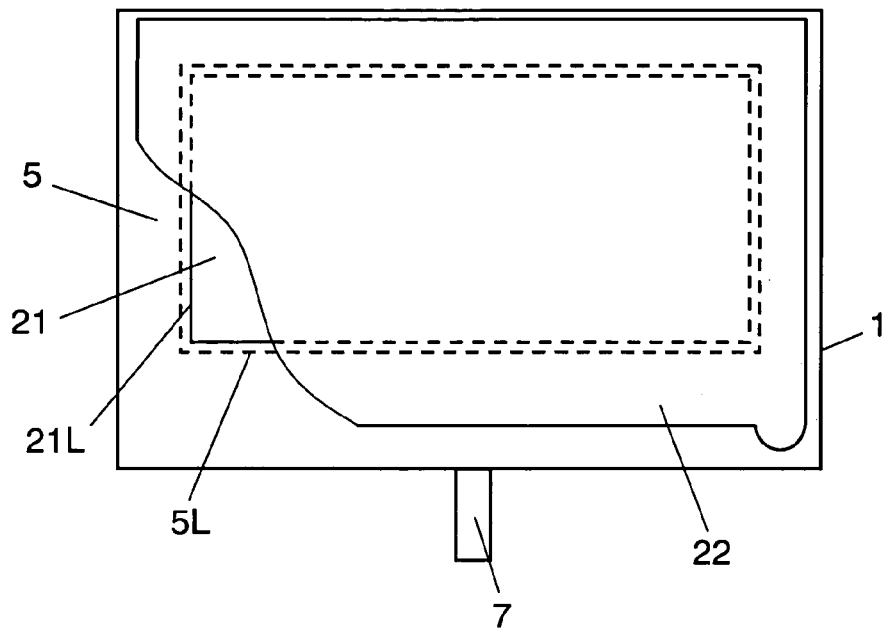
FIG. 3 is a bottom view of the touch panel according to the embodiment of the present invention, with a separator partially taken away, showing the touch panel before being mounted.

Further, as shown in FIG. 3, outer frame 5 in a picture frame shape has inner circumferential edge 5L formed in a rectangular shape as indicated by the dotted line and the area within the inner circumferential edge serves as the visible area of the touch panel. On first transparent conductive film 2 corresponding to the visible area, there are provided dot spacers 6 (refer to FIG. 1) at predetermined intervals.

Further, there is provided flexible printed circuit board 7 (refer to FIG. 3) in electrical connection with each of first transparent conductive film 2 and second transparent conductive film 4 for connecting them with an external apparatus as with conventional touch panels.

A characteristic of the touch panel of the present embodiment lies in the condition of adhesive layer 21 provided on the bottom face of first substrate 1 placed on the lower side for mounting the touch panel on the apparatus. More specifically, adhesive layer 21 is provided only on the entire surface of the range corresponding to the visible area. If it is explained with reference to FIG. 3, circumferential edge 21L of adhesive layer 21 is disposed inwardly from inner circumferential edge 5L of outer frame 5.

In the state of the touch panel before it is mounted in place, separator 22 whose side in contact with adhesive layer 21 is provided with easy release treatment is piled to the underside of adhesive layer 21 to cover adhesive layer 21. Separator 22 has a shape larger than circumferential edge 21L of adhesive layer 21 and the same or slightly smaller than the outside shape of first substrate 1, as shown in FIG. 3.

Figure 2:
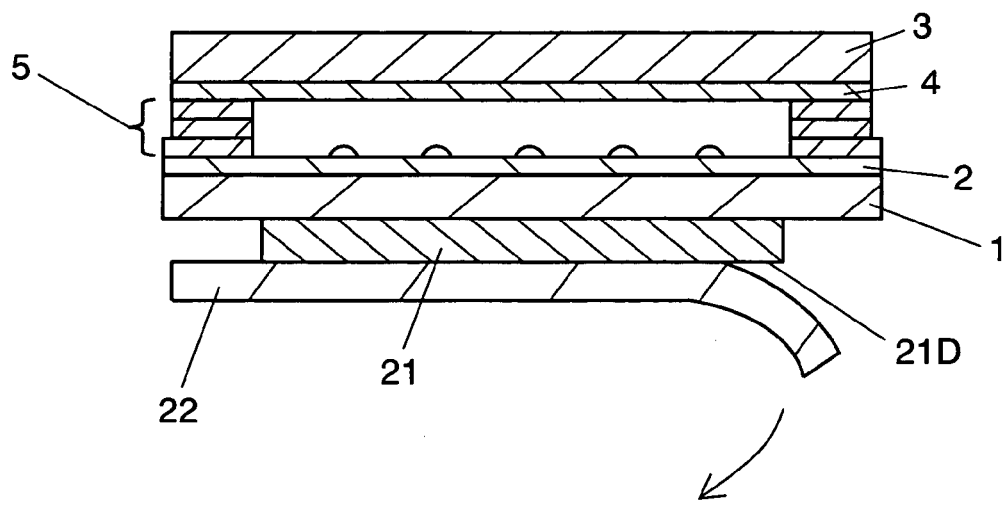
FIG. 2 is a sectional view showing a preparatory state for mounting the touch panel according to the embodiment of the present invention.

When the touch panel of the present embodiment configured as above is to be attached to the electronic apparatus, separator 22 is peeled off as shown in FIG. 1 and FIG. 2. Then the thus uncovered underside-of-adhesive-layer 21D is bonded to the mount portion of liquid crystal display 12 of the apparatus.

Since adhesive layer 21 is not formed at the portion corresponding to outer frame 5 of separator 22 as shown in FIG. 3, separator 22 can be easily removed by peeling it off, with one end of the adhesive portion pressed down. By virtue of such a configuration, the portion of separator 22 corresponding to the position of outer frame 5 can be effectively utilized.

Then, in the touch panel according to the present embodiment with separator 22 peeled off, pressure with use of a rubber jig or the like is applied to the touch panel from above the touch panel such that only the visible area, excepting the portion of outer frame 5, is pressed down. Thus the underside of adhesive layer 21 is bonded to the mount portion gradually from its one end to the other and thereby the mounting work is completed.

At this time, it is of importance that the underside of adhesive layer 21 is bonded with use of a jig or the like on to the mount portion by having only the visible area, except the portion corresponding to the outer frame 5, pressed down. By using the described method, the entire surface of the substantially stepless visible area of adhesive layer 21 can be bonded to the mount portion, not affected by the thickness of outer frame 5. Thus, a high quality electronic apparatus free from formation of air bubbles and excellent visibility can be obtained.

Since the present embodiment is configured such that adhesive layer 21 is not formed at the portion corresponding to outer frame 5, the portion corresponding to outer frame 5 is prevented from being accidentally stuck to the mount portion or the like during the mounting process and hence good workability in the mounting work can be obtained.

Further, the touch panel with separator 22 peeled off can be handled by utilizing outer frame 5 where there is formed no adhesive layer 21, ease of handling can be greatly enhanced.

Since operation of the touch panel, after it has been mounted on liquid crystal display 12 or the like as the mount portion of the apparatus, is the same as that of the conventional touch panel, description of the operation will be omitted.

The electronic apparatus of the present invention mounting the touch panel on liquid crystal display 12 can assure good visibility and excellent appearance of the display, as the entire visible area of the touch panel is mounted in tight contact with the display and formation of air bubbles in the bonded portion is remarkably reduced.

Figure 4:
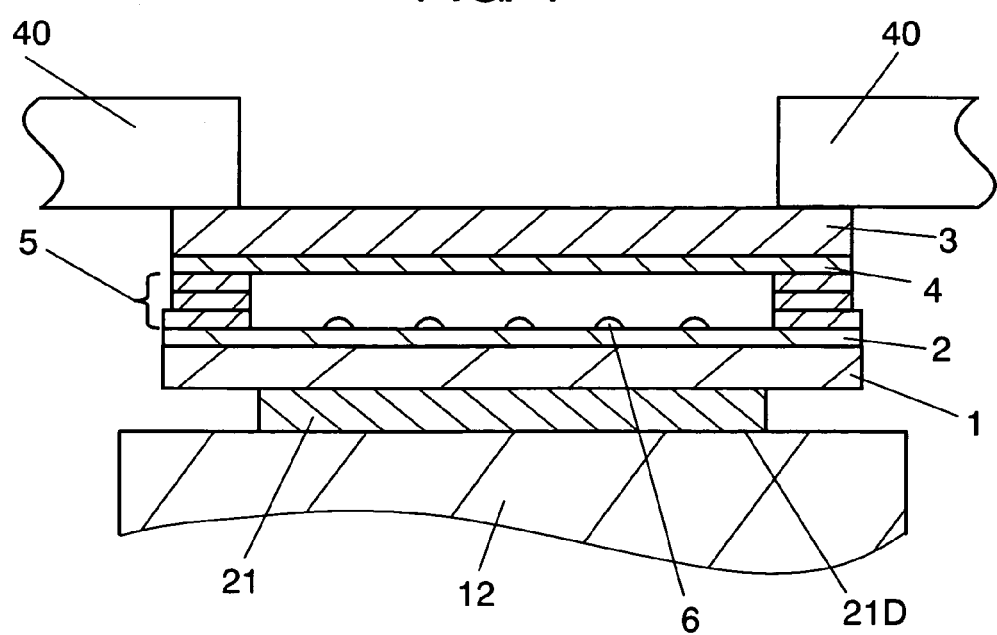
FIG. 4 is a sectional view showing a state of the touch panel according to the embodiment of the present invention mounted on an electronic apparatus.
Figure 5:
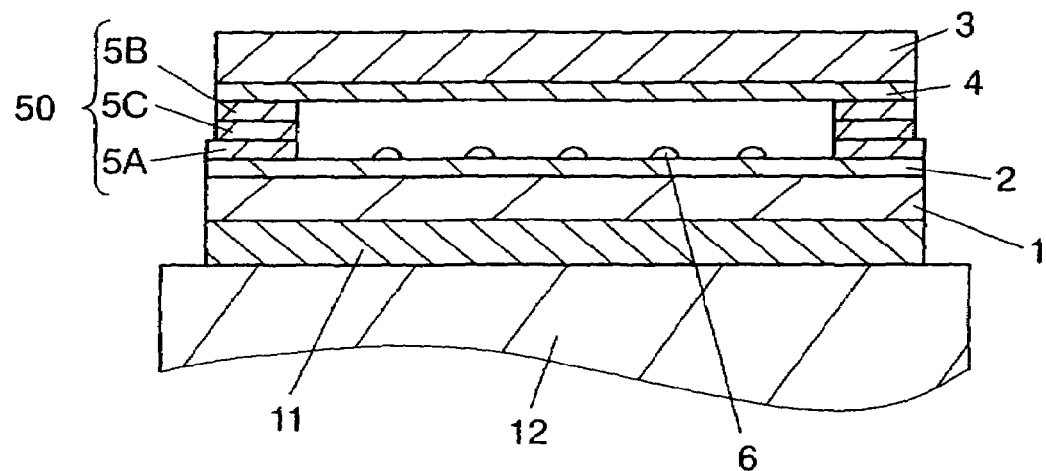
FIG. 5 is a sectional view showing a conventional touch panel as mounted on an electronic apparatus.
Figure 6:
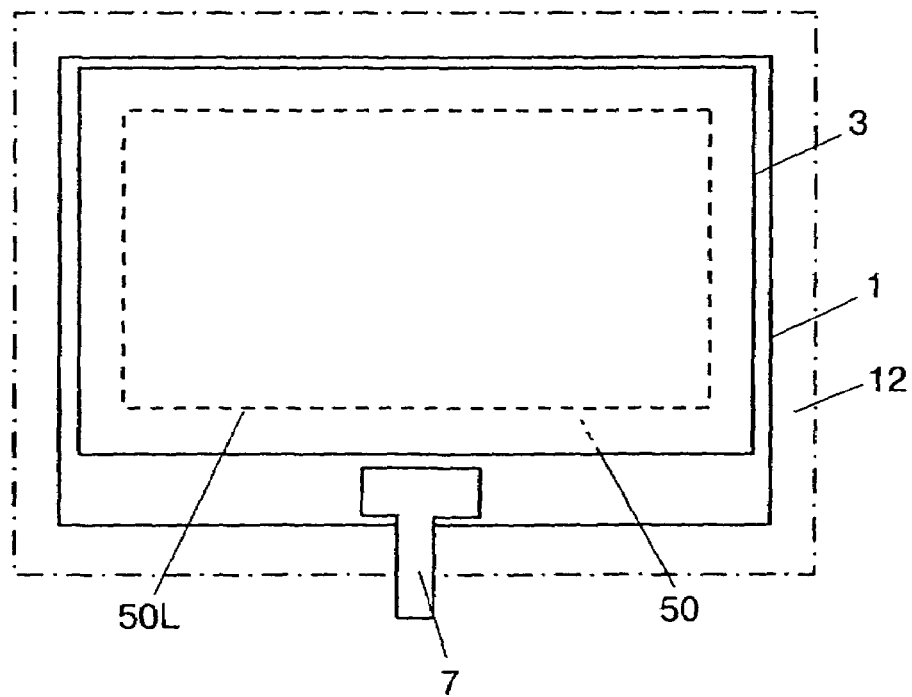
FIG. 6 is a top view showing the conventional touch panel as mounted on an electronic apparatus.

As described with reference to FIG. 3, the touch panel according to the present invention has adhesive layer 21 on the inner side of outer frame 5 in a picture frame shape. Thickness from 20 μm to 30 μm is suitable for adhesive layer 21, while the thickness of outer frame 5 is preferred to be thicker than the thickness of adhesive layer 21 by 10 μm or more. When a touch panel of the described configuration is mounted on liquid crystal display 12 of an electronic apparatus, it is preferred that outer casing 40 of the electronic apparatus using the touch panel be configured to press the entire circumference of outer frame 5 uniformly as shown in FIG. 4. More specifically, the circumferential portion of the opening of outer casing 40 has a portion superimposing upon outer frame 5 via second substrate 3, such that outer casing 40 can press down outer frame 5 via second substrate 3. In such a configuration, when the circumferential portion of the opening of outer casing 40 presses down second substrate 3, first substrate 1 being flexible is given a deformation as large as the thickness of adhesive layer 21, at its maximum. Hence, second substrate 3 is subjected to some stretch and thus air bubbles are not formed in the adhesive portion and visibility of the touch panel is enhanced. Further, by keeping first substrate 1 and second substrate 3 uniformly pressed via outer frame 5 by means of outer casing 40, some stretch can be given to both first substrate 1 and second substrate 3 and thus suitable tension is given to first substrate 1 and second substrate 3. Therefore, the feeling at the time of inputting operation is improved.

As the touch panel of the present invention, an example where the present invention is applied to a transparent touch panel of a film-film type has been described above. However, the present invention can be applied also to other configurations, e.g., to a film-glass type and a film-film type to which a supporting substrate is added.

Further, in the case where a supporting substrate is added to a film-film type, the thought of the present invention may also be applied to the bonded portion between the supporting substrate and the film bonded to the substrate.

In the touch panel and the apparatus using the touch panel according to the present invention, mounting work can be performed with air bubbles and the like hardly formed in the bonded portion. The electronic apparatus using the touch panel according to the present invention can be easily turned into a one that provides high quality of visibility inside the visible area of the display.

The present invention, mounted on the display side of liquid crystal display or the like, is effectively applicable to electronic apparatuses requiring inputting of coordinates in accordance with displayed contents by a push operation with a pen or finger.

What is claimed is:

1. A method of mounting a touch panel, the touch panel including
    a first substrate having a transparent conductive film,
    a second substrate having a transparent conductive film,
    an outer frame for bonding the first substrate and the second substrate together such that a predetermined space is kept therebetween,
    a visible area inside the outer frame;
    an adhesive layer provided on the first substrate, the adhesive layer disposed on an entire face of the first substrate within an inner circumferential edge of the outer frame, and
    a separator attached to a surface of the adhesive layer, the separator being larger than a circumferential shape of the adhesive layer and smaller than an outer shape of the first substrate;
    the method of mounting comprising:
    peeling the separator off the adhesive layer, and
    bonding the touch panel on a display by means of the adhesive layer,
    wherein only the visible area is pressed to bond the touch panel on the display in the bonding process.

2. The method of mounting a touch panel according to claim 1, further comprising
    pressing down only a portion within the inner circumferential edge of the outer frame.

* * * * *